United States Patent
Ciamillo

(10) Patent No.: US 7,854,181 B2
(45) Date of Patent: Dec. 21, 2010

(54) MANUAL TRANSMISSION SHIFTER

(76) Inventor: George J. Ciamillo, 4159 Mike Padgelt Hwy., Augusta, GA (US) 30906

( * ) Notice: Subject to any disclaimer, the term of this patent is extended or adjusted under 35 U.S.C. 154(b) by 1379 days.

(21) Appl. No.: 11/044,540

(22) Filed: Jan. 27, 2005

(65) Prior Publication Data

US 2005/0103146 A1 May 19, 2005

Related U.S. Application Data

(60) Provisional application No. 60/623,164, filed on Oct. 29, 2004.

(51) Int. Cl.
G05G 1/04 (2006.01)
G05G 5/00 (2006.01)
(52) U.S. Cl. ...................... 74/525; 74/473.29
(58) Field of Classification Search ................ 74/473.1, 74/473.29, 473.3, 522, 523, 525, 551.1, 528, 74/551.3, 551.4
See application file for complete search history.

(56) References Cited

U.S. PATENT DOCUMENTS

| | | | | |
|---|---|---|---|---|
| 1,876,709 A * | 9/1932 | MacPherson | ............... | 74/473.3 |
| 1,983,063 A * | 12/1934 | Baits | ........................... | 74/343 |
| 3,219,296 A * | 11/1965 | Rasmussen | ................... | 244/234 |
| 4,492,129 A * | 1/1985 | Hasegawa | ................ | 74/473.29 |
| 4,768,393 A * | 9/1988 | Beaman | .................... | 74/473.29 |
| 4,805,476 A * | 2/1989 | Beauch et al. | ........... | 74/473.31 |
| 4,865,277 A * | 9/1989 | Smith et al. | .................. | 244/234 |
| 4,981,047 A * | 1/1991 | Denda et al. | ........... | 74/471 XY |
| 5,094,326 A * | 3/1992 | Schemelin et al. | ......... | 192/3.63 |
| 5,189,925 A * | 3/1993 | Neal et al. | ............... | 74/473.29 |
| 5,347,881 A * | 9/1994 | Watson et al. | ............ | 74/473.29 |
| 5,452,623 A * | 9/1995 | Knight | .................... | 74/473.29 |
| 5,769,363 A * | 6/1998 | Griswold et al. | ............ | 244/234 |
| 5,807,010 A * | 9/1998 | Parker et al. | .................. | 403/61 |
| 5,907,974 A * | 6/1999 | Stine | ....................... | 74/473.21 |
| 6,029,535 A * | 2/2000 | Kenny et al. | ............... | 74/473.3 |
| 6,301,987 B1 * | 10/2001 | Chakri et al. | .............. | 74/473.3 |
| 6,360,627 B1 * | 3/2002 | Buckingham et al. | ...... | 74/473.3 |
| 6,732,847 B1 * | 5/2004 | Wang | ...................... | 192/220.4 |
| 6,769,325 B2 * | 8/2004 | Molde et al. | ............. | 74/473.28 |
| 7,000,497 B1 * | 2/2006 | Campbell et al. | ............ | 74/525 |
| 7,032,474 B2 * | 4/2006 | Tucker | .................... | 74/473.29 |
| 2002/0112561 A1 * | 8/2002 | Liao | ......................... | 74/551.3 |
| 2002/0124675 A1 * | 9/2002 | Hashimoto et al. | ........ | 74/473.29 |
| 2003/0213326 A1 * | 11/2003 | Fett et al. | .................... | 74/473.3 |
| 2006/0021459 A1 * | 2/2006 | Buckingham et al. | .... | 74/473.29 |

* cited by examiner

*Primary Examiner*—Thomas R Hannon
*Assistant Examiner*—Phillip A Johnson
(74) *Attorney, Agent, or Firm*—Ariel S. Bentolila; Bay Area IP Group, LLC

(57) ABSTRACT

An automobile manual transmission shifter is provided that includes a shifter central shaft means for dampening at least part of the vibration transmitted from the manual automobile transmission, and an adjustable swivel shifter handle means for maintaining a continuous perpendicular gripping position while allowing rotatational adjustment of the swivel shifter handle means about the shifter central shaft means. Some embodiments may not include the vibration dampening means.

12 Claims, 12 Drawing Sheets

(a)

(b)

MANUAL TRANSMISSION SHIFTER

CROSS-REFERENCE TO RELATED APPLICATIONS

The present Utility patent application claims priority to provisional application for patent No. 60/623,164 filed on Oct. 29, 2004.

FIELD OF THE INVENTION

The present invention relates generally to manual transmission shifters. More particularly, the invention relates to manual transmission shifters that isolate vibration and maintain continuous perpendicular gripping positions.

BACKGROUND OF THE INVENTION

As illustrated by way of example in FIGS. 1 and 2, practically all manual transmission vehicles (in particular mustangs) have a conventional shifter principle which although may vary in actual specific design pretty much all work identical. The transmission in a car has a linkage that moves the gears inside the transmission in order to operate the vehicle in both forward and reverse. Some cars have 3 speeds. Some have 4, 5 or even 6 forward gears. Regardless the function is the same. The linkage inside the transmission needs to be manipulated by the driver while seated in the drivers seat. To achieve this a commonly referred to as a "shifter" is bolted inside the car, which on top has a shift "knob" that the driver grabs to change gears and on bottom has a small ball socket that inserts into the transmission itself. This "shifter" is the only way that the driver can actually place the car in the proper gear to move forward or reverse. All known shifters generally use a pivot ball that basically works much like a seesaw. As the driver pulls back on the shift "knob" the center shaft pivots on a ball which in turn makes the small ball socket pivot in the opposite direction inside the transmission thus "selecting a gear". The distance between the fulcrum or pivot ball, and the small ball socket determines what is known as the "throw" of the shifter.

Stock shifters and all known aftermarket shifters generally have a solid one piece center shaft that goes all the way down inside the car into the transmission. Unfortunately, this allows virtually all noise and vibration originating from the transmission (which is known to have a great deal of vibration) to transfer up and thru the shifter center shaft into the shift knob handle, and thereby into the driver's hand. Known factory, or OEM, units utilize a relatively thick rubber gasket on the shift handle as an attempt to muffle this noise. This works adequately, yet such approaches are known to cause the shift handle to flex significantly, and feel very "loose" or "mushy" to the driver when shifting gears. Hence, known aftermarket shifters eliminate this rubber gasket to stiffen the feel of the shift handle but this consequentially removes any noise insulation from the transmission and therefore causes the shifter to buzz and vibrate, often to unacceptable levels.

Known stock shifters feature have a bent shift handle that is bent to attempt to move the shift knob position back to the driver for better ergonomics. All other aftermarket shifters use a very similar handle, which may have different bends or heights but basically do the same thing. However, they do not give any adjustments left or right, which can limit the ergonomics for each type of driver. Every person has unique height, weight, arm length, leg length etc. A shifter that is not capable of adjusting left to right or front to back is usually not able to please every driver. FIG. 1 illustrates handles of a prior-art stock shifter and a popular aftermarket handle. Those skilled in the art will recognize such approaches clearly lack any adjustable positioning. The handle bolts to its shifter in only one place, unlike the handle of the present invention.

The present inventor has designed and brought to market a prior approach, which was comprised of an adjustable handle that used a 12 mm bolt inside an aluminum housing that attached to the shift shaft. This handle offered some adjustability because the design bent the bolt about 15 degrees. When rotating the bolt it would pivot over to the driver. One significant problem with this prior design was that customers still complained because the shift knob also rotated or "leaned" left or back, which made it uncomfortable when shifting gears. This prior approach, which was designed and marketed by the present applicant, has since product introduction been widely copied by competitors, but none have improved on its design in any significant manner. The present applicant regards our prior design as inferior at least for the foregoing reasons and realized there was a need for an improved solution to this shifting handle problem.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates, by way of example, upper shaft piece 350 pressed onto lower shaft piece 330 with lower shaft cap 340 interposed there between;

Figure 1:
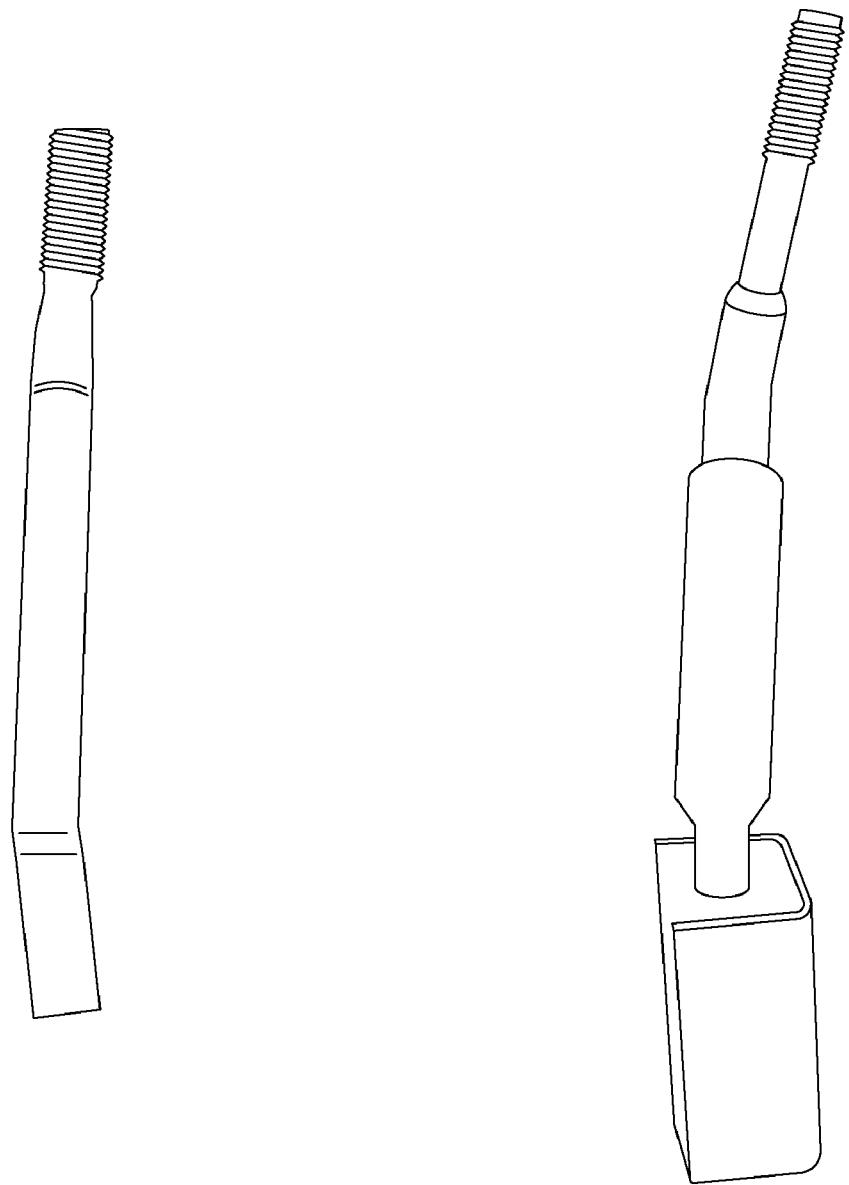
FIGS. 1 and 2 illustrate, by way of example, a side view of some common conventional manual transmission gear shifters.
Figure 2:
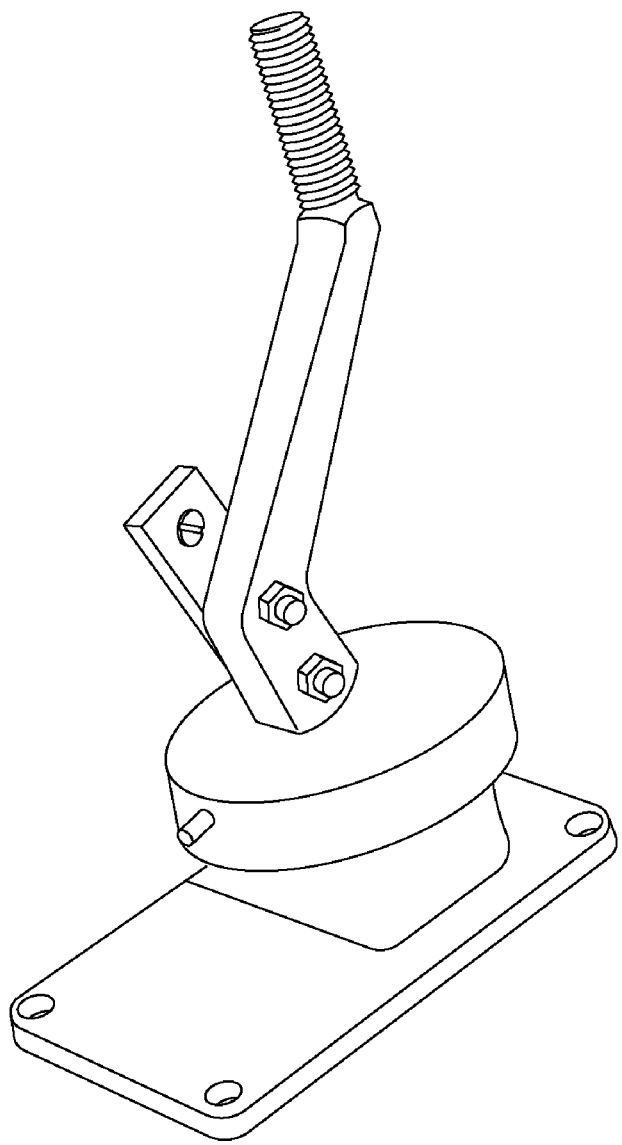

Unless otherwise indicated illustrations in the figures are not necessarily drawn to scale.

SUMMARY OF THE INVENTION

To achieve the forgoing and other objects and in accordance with the purpose of the invention, a variety of manual transmission shifter techniques are described. Some aspects of which include an ergonomic design, noise suppression, and/or a fully adjustable swivel shift handle.

In one embodiment, an automobile manual transmission shifter is provided, which includes a lower shaft having a lower end portion that is configured to properly interface with a manual automobile transmission and an upper end portion having a mounting boss, a vibration absorbent cap (e.g. made of hardened rubber), the vibration absorbent cap being mounted upon the mounting boss, and configured to dampen at least part of the vibration transmitted from the manual automobile transmission, an upper shaft having a lower end portion that is configured to properly mate with the vibration absorbent cap, the lower end portion of the upper shaft being joined upon the vibration absorbent cap, and a shifter handle rotatably joined to an upper portion of the upper shaft such that its vertical motion is at least partially constrained. In some embodiments, the top of the mounting boss includes a tapped, threaded hole for receiving a shaft joining bolt; and, in some applications, the shaft joining bolt is inserted through the upper shaft from the top thereof and screwed into to the treaded hole of the mounting boss of the lower shaft, thereby fixedly joining the upper shaft to the lower shaft. To achieve a continuous rotatable joining to the upper portion of the upper shaft, some embodiments of the shifter handle include a smooth, circular bored hole. To, instead, achieve a step-wise rotatable joining to the upper portion of the upper shaft, some embodiments of the shifter handle include a bored hole that is polygonal shaped. Some embodiments of the shifter handle are further provided with a split collar means for joining the shifter handle to the upper shaft.

Yet other embodiments of the present invention are the same as the foregoing embodiments, except they do not include the noise suppression aspect of the present invention, and, hence, do not include a split shaft design with an interposed vibration absorbent cap.

In yet other embodiments, an automobile manual transmission shifter includes a shifter central shaft means for dampening at least part of the vibration transmitted from the manual automobile transmission; and an adjustable swivel shifter handle means for maintaining a continuous perpendicular gripping position while allowing rotational adjustment of the swivel shifter handle means about the shifter central shaft means.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is illustrated by way of example, and not by way of limitation, in the figures of the accompanying drawings and in which like reference numerals refer to similar elements. The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments.

Those skilled in the art will recognizes that embodiments of the present invention described below are at least useful to the manual transmission shifter mechanism in the ford mustang and ford cobra vehicles produced between 1990-present. The present invention is contemplated to be applicable to all types of transmissions available in these vehicles both past and present during these years of production (e.g., 1990-present). However, those skilled in the art will moreover appreciate that the present invention more generally applicable to other domestic sports cars such as, by way of example and not limitation, the dodge viper and Chevrolet corvette. Hence, although the embodiments shown and described are directed to mustang implementation examples, the present invention is understood to extend to all suitable applications in accordance with the following teachings.

Aspects of the present invention improve upon the design of a conventional transmission shifter by providing at least the aspects of improved ergonomics, noise suppression, and a fully adjustable swivel shift handle suitable for both the stock OEM shifter and aftermarket shifters.

Because it is relatively difficult and costly to retrofit existing shifters to incorporate the ergonomic and noise controlling aspects, the following embodiment does not adapt conventional shifter designs, but instead sets forth a preferred embodiment of the present invention suitable to carry out the principles set forth as follows.

The noise insulating shaft aspect of the present invention will now be described in some detail. In an embodiment of the present invention, the noise and vibration insulation aspect of our shifter is achieved by splitting in two pieces the center linkage shaft that connects the actual transmission down inside the car to the shift knob, which the driver grasps with his hand when shifting gears in the mustang.

Figure 3:
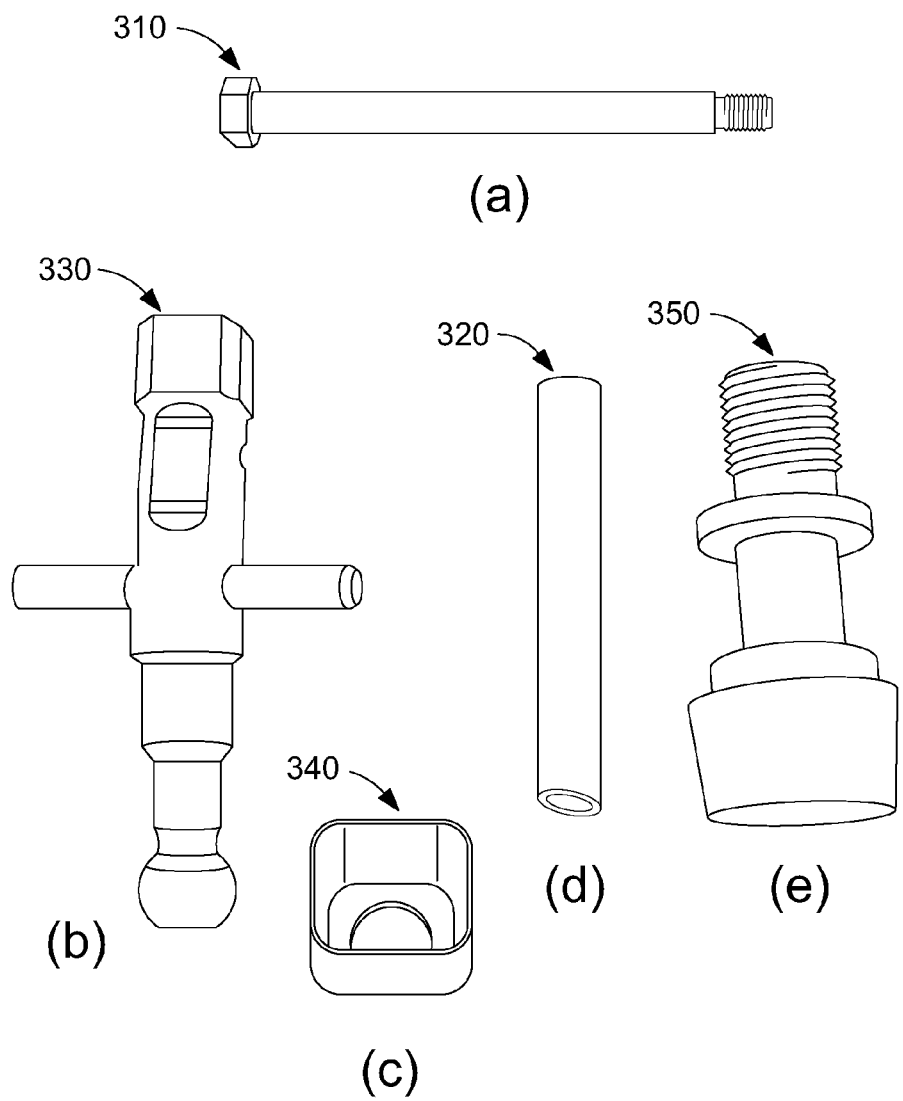
FIG. 3 illustrates, by way of example, the components that are comprised in a center shaft embodiment of the present invention.

FIG. 3 illustrates, by way of example, the components that are comprised in a center shaft embodiment of the present invention. The center-shaft embodiment includes a means for joining, which includes five principle components used to isolate the lower half of the shaft from the upper half, and thereby remove, or substantially reduce, transmission noise and vibration. It should be appreciated that the design of the present embodiment is such that it does not require the noise thick, isolating rubber used in conventional shifters; hence, the present embodiment does not have the corresponding loose or mushy feel of conventional or stock shifters. The assembly illustrated in FIG. 3 comprises the components as follows. FIG. 3(a) illustrates a standard shoulder bolt 310 (in the example shown, ⅜ inch in diameter and 4 inches long). FIG. 3(d) illustrates a bolt sleeve 320, which may be implemented as a standard rubber tube having an inside diameter sufficient to cover shoulder bolt 310. FIG. 3(b) illustrates an exemplary lower shaft piece 330, which is actually the part of the present shifter that connects to the car's transmission. FIG. 3(c) illustrates an exemplary and relatively thin square compliant lower shaft cap 340, which as will be later shown, mates to cover the square top end portion of lower shaft piece 330. Compliant lower shaft cap 340 is preferably made of any relatively stiff, but somewhat compliant material, including, but not limited to common hardened rubber. FIG. 3(e) illustrates an exemplary upper shaft piece 350, which has a female receiving pocket shaped exactly to snugly receive lower shaft cap 340.

As described in some detail below, the present embodiment may be thought of as taking a solid one piece shaft, snapping it in half and then reattaching the top and bottom pieces with rubber in between to stop the vibration from traveling up the shaft. By doing this along the centerline instead of with a side-mounted handle like the stock factory shifter has, you can drastically reduce, if not effectively eliminate noise, and not have a "rubbery" sloppy feel to the shifter handle as is the case in conventional approaches. FIGS. 2 through 5 to illustrate the components and progressive assembly steps towards making a shaft assembles in accordance with an embodiment of the present invention.

The five components shown in FIG. 3 are assembled to make the center shifter shaft of a shifter in accordance with the center shaft embodiment of the present invention. The steps to assemble the shown components are relatively simple. In general, a first step is to slide lower shaft cap 340 onto the square machined boss on lower shaft piece 330. A second step is to join the "lower" half of the center shaft and the "upper" half together with lower shaft cap 340 sandwiched in between, and they are screwed together with shoulder bolt 310 to make the unit one piece again such that there is no "metal to metal" contact between the, upper and lower shaft pieces. When joining the upper and lower shaft halves together, the female pocket of upper shaft piece 350, which is the same shape as the upper shaft cap, is pressed down onto the lower shaft/cap subassembly.

Figure 4:
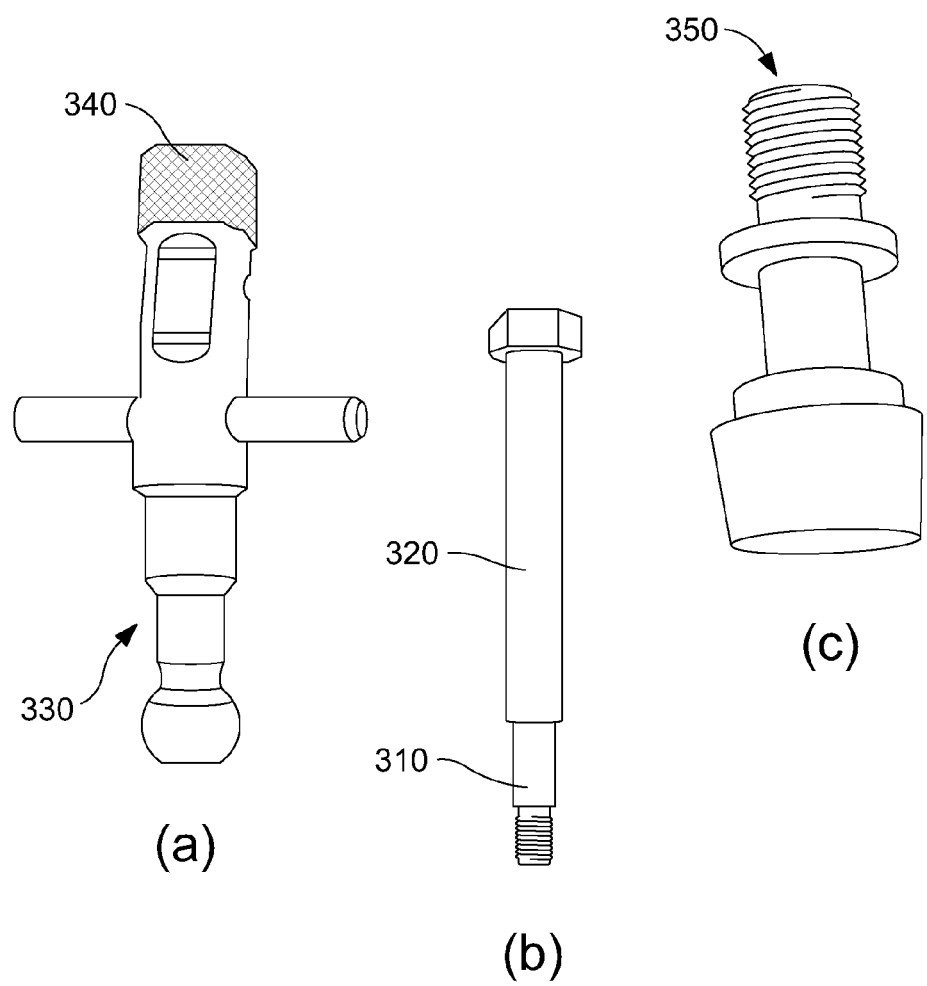
FIG. 4 illustrates, by way of example, the state of the components after the first step in assembling the center shaft.

FIG. 4 illustrates, by way of example, the state of the center shaft embodiment components after the first step in assembling the center shaft. FIG. 4a illustrates lower shaft cap 340 being pressed onto the square boss of lower shaft piece 330. FIG. 4b illustrates bolt sleeve 320 being applied over shoulder bolt 310. Bolt sleeve 320

In one aspect, bolt sleeve 320 is slid onto shoulder bolt 310 to insulate it from the upper shaft. Those skilled in the art will recognize the appropriate selection and configuration of bolt sleeve 320. Although as suitable dimensions will work, in the present example, bolt sleeve 320 has a ⅜-inch inside diameter and a half-inch outside diameter to properly fit inside the upper shaft piece.

Figure 5:
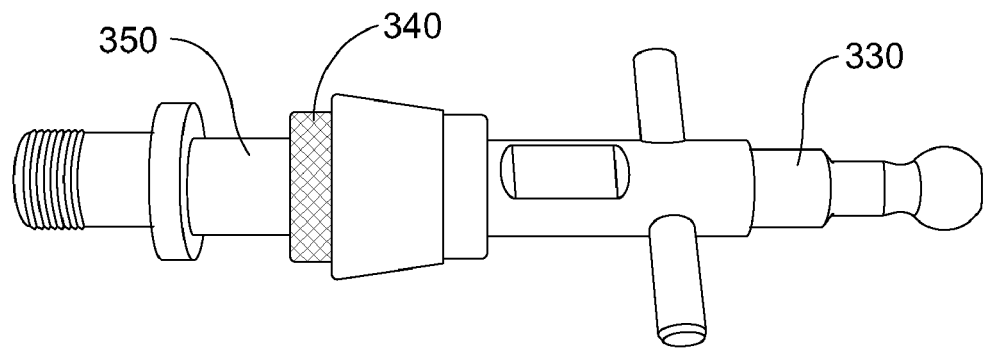
Figure 5:
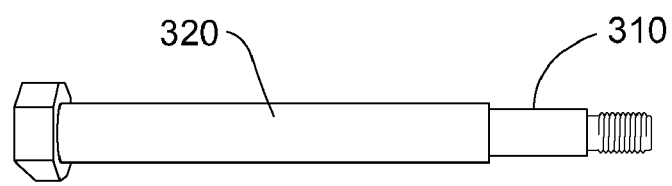

FIG. 5 illustrates, by way of example, upper shaft piece 350 pressed onto lower shaft piece 330 with lower shaft cap 340 interposed there between.

Figure 6:
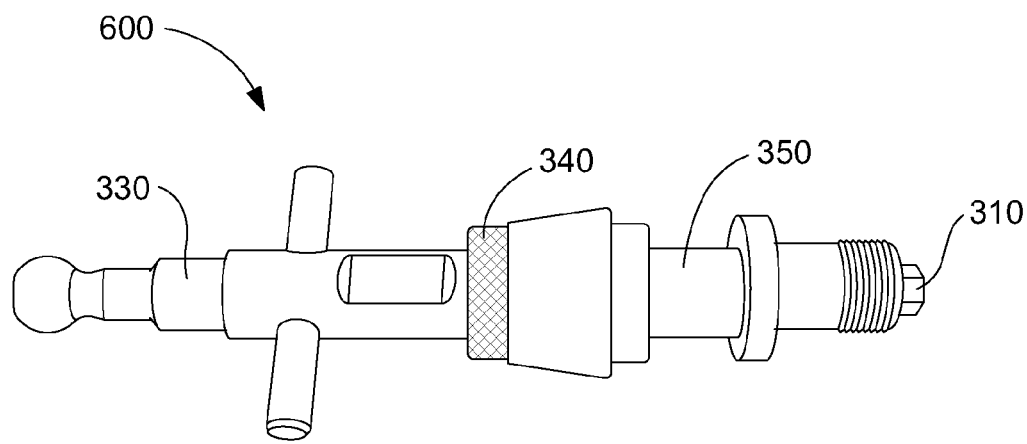
FIG. 6 illustrates, by way of example, the completed center shaft according to a center shaft embodiment of the present invention.

FIG. 6 illustrates, by way of example, the insertion of shoulder bolt 310 and bolt sleeve 320 (hidden within upper shaft piece 350) into the central hole down the middle of upper shaft piece 350 where it is screwed into the top, center of lower shaft piece 330's square boss. Shoulder bolt 310 is sufficiently tightened to rigidly hold all the shown pieces into one relatively rigid structure, thereby completing a center shaft structure 600. Center shaft 600 is suitable for use in a shifter mechanism similar to conventional shifters for similar applications.

Alternate methods of manufacturing insulating shaft aspect of the present invention will now be described in some detail. Center shaft 600 utilizes the components shown in FIGS. 2-5, however, the teachings and spirit of the present invention allows several alternative techniques that may or may not be included depending upon the needs of the particular application. For example, some application may not require the noise isolation aspect of the present invention and correspondingly may not include lower shaft cap 340, which acts to isolate the upper and lower shaft to prevent, or at least substantially reduce, the transmission of vibration and noise from reaching the cockpit of the automobile. It should be appreciated that the noise isolation aspect of the present invention is more generally applicable to other domestic sports cars such as, by way of example and not limitation, the dodge viper and Chevrolet corvette.

Those skilled in the art will readily recognize a multiplicity of alternative embodiments and assembly techniques of the components the comprise center shaft 600. By way of example, and not limitation, some exemplar implementation details and variations follow. That is, some embodiments of lower shaft cap 340 may not be configured or otherwise shaped exactly as shown. That is, some manufacturers may choose to use larger or smaller diameter shafts and rubber pieces, or change the material from hardened rubber to, for example, even a plastic polymer or other suitable conventional materials if they prove effective in adequately isolating the upper and lower shaft components from each other along the centerline to, thereby, maintain the lateral rigidity of center shaft 600. By way of further example, in some alternative embodiments of center shaft 600, shoulder bolt 310 and/or bolt sleeve 320 may be eliminated by making lower shaft piece 330 with built in shaft (possibly dimensioned similar to shoulder bolt 310) above the square boss where lower shaft cap 340 mounts. Such alternative embodiments of the present invention may use any known means for retaining the upper shaft; for example, by simply using a c-clip or set screw cap to hold the upper shaft onto the lower shaft. However, the shaft bolt/sleeve configuration of the center shaft embodiment shown, is, at least in some applications, known to be useful for its strength and tight dimensional tolerances. It should be further appreciated that the particular choice of structural materials in the forgoing embodiment is not contemplated to be central or critical to the function or teachings of the present invention. Hence, the material selected for any of the foregoing components may be suitably substituted as required by the needs of the particular application. For example, although the material used in the foregoing embodiments is stainless steel, other embodiments may, instead, use carbon steel or even titanium, or any other suitable material that will be readily apparent to those skilled in the art.

A fully adjustable swivel shift handle aspect of the present invention will now be described in some detail. Many different design attempts to achieve a higher performance shift handle were made by the present applicant before arriving at an optimal reach and comfort as well as an optimal knob angle and position as will be discussed in the context of the following exemplary shift handle embodiments.

Figure 7:
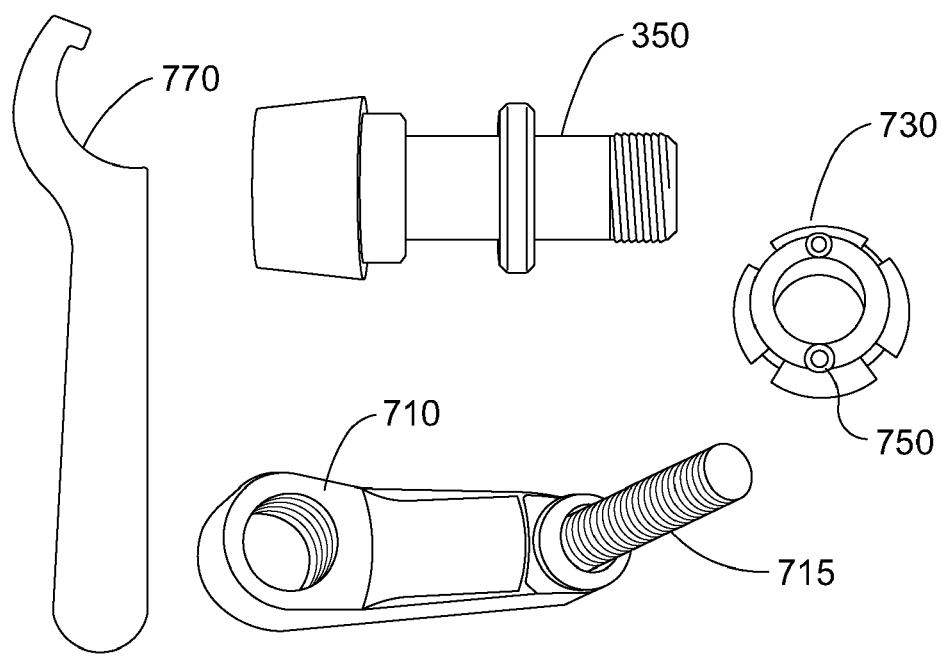
FIG. 7 illustrates by way of example the assembly components to make a shifter handle according to a first handle embodiment of the present invention.

FIG. 7 illustrates by way of example the assembly components to make a shifter handle according to a first handle embodiment of the present invention. Upper shaft piece 350, or the handle-mounting end of the shifter center shaft, is provided with a proper lathe turned top end (e.g., with a ¾"-16 thread). To achieve a continuous rotational freedom of adjustment, a shifter handle 710 is bored with a relatively smooth hole wide enough to slide onto the threaded end of upper shaft piece 350 without too much play (e.g., a ¾41 so that the handle may easily drop down onto the center shaft). Shifter handle 710 is further provided with a shifter knob 715, which the driver grips to control the position of the present shifter assembly. Then a spanner lock nut 730 (e.g., with matching ¾" threads) is screwed down onto the threaded end of upper shaft piece 350 and tighten up to, but just before, contacting shifter handle 710, thereby vertically constraining shifter handle 710 into position, but allowing shifter handle 710 to freely rotate on the horizontal plane, thereby permitting the driver to find the most comfortable position for driving. A optional spanner locking screw(s) 750 (e.g., two are 10-32 screws) may be disposed about spanner lock nut 730 to further resist against rotational loosening of spanner lock nut 730, and thereby further assure the locking into place of shifter handle 710. That is, locking screw(s) 750 are simply an added precaution to avoid the loosening of shifter handle 710 during operation.

To assemble the adjustable shifter handle embodiment, shifter handle 710 is first slid onto the threaded end of upper shaft piece 350, and then spanner lock nut 730 is screwed on top of shifter handle 710 and vertically constrained. A spanner wrench 770, or any other suitable tool, may be used to tighten spanner lock nut 730 onto the top half of the shifter center shaft. If implemented, locking screws 750 are then screwed into place. The top half of the center shifter shaft is shown for reference only. In this way, shifter handle 710 is rigidly mated to the upper end of center shaft 600 in a relatively simple manner.

Figure 8:
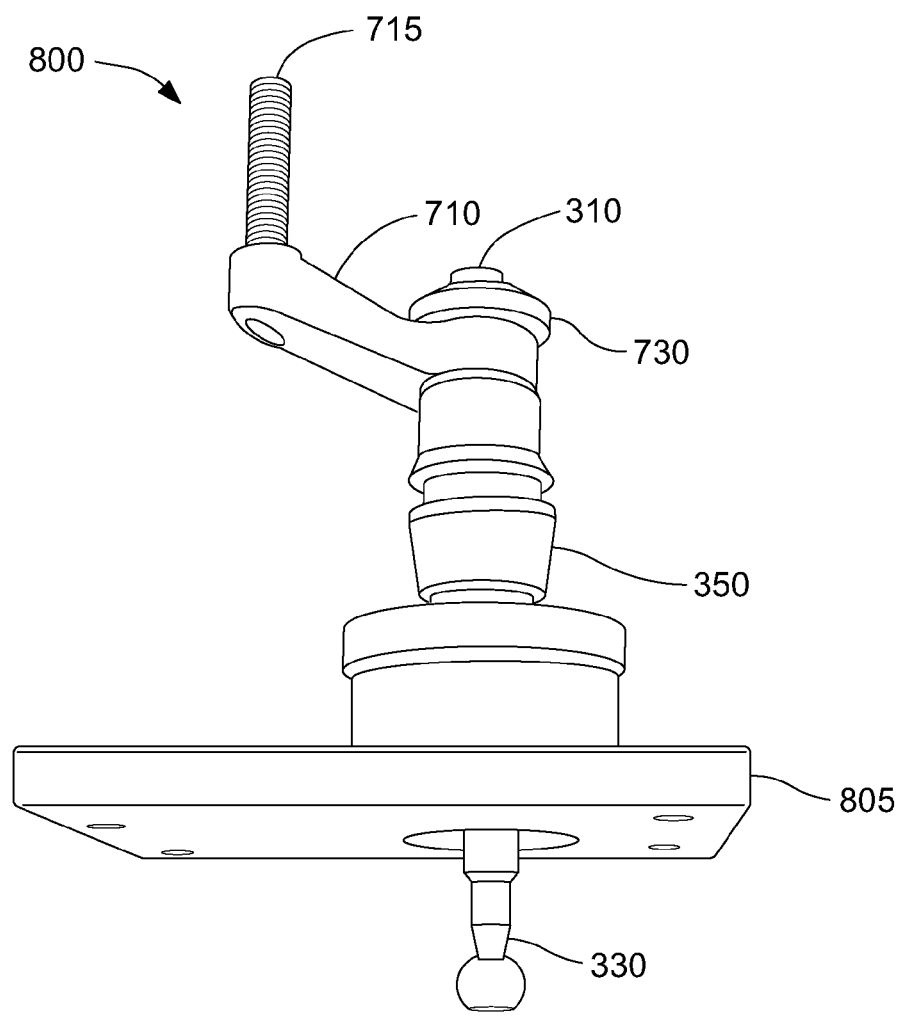
FIG. 8 illustrates by way of example, a side view of a completed, fully adjustable shifter installed in a typical application, in accordance with an embodiment of the present invention.

FIG. 8 illustrates by way of example, a completed, fully adjustable swivel shifter 800 installed in an exemplary shifter mount 805, in accordance with the first embodiment of the present invention. As those skilled in the art will appreciate, one attendant aspect of the embodiment shown is that shifter handle 710 may be pivoted 360 degrees in rotation to enable the driver to achieve the optimal shifter handle angle adjustment for the given shifter position, thereby providing the driver a near infinite set of adjustment positions without substantially changing the angle or height of the shift knob in any way. Given that conventional shifter handles can only adjust the shifter knob location by changes the angle of the shifter knob (which is very undesired), users of embodiments of the present invention will appreciated that the present embodiment provides the operator the ability to change the shifter knob position while keeping the shifter knob relatively straight up and perpendicular to level ground.

Figure 9:
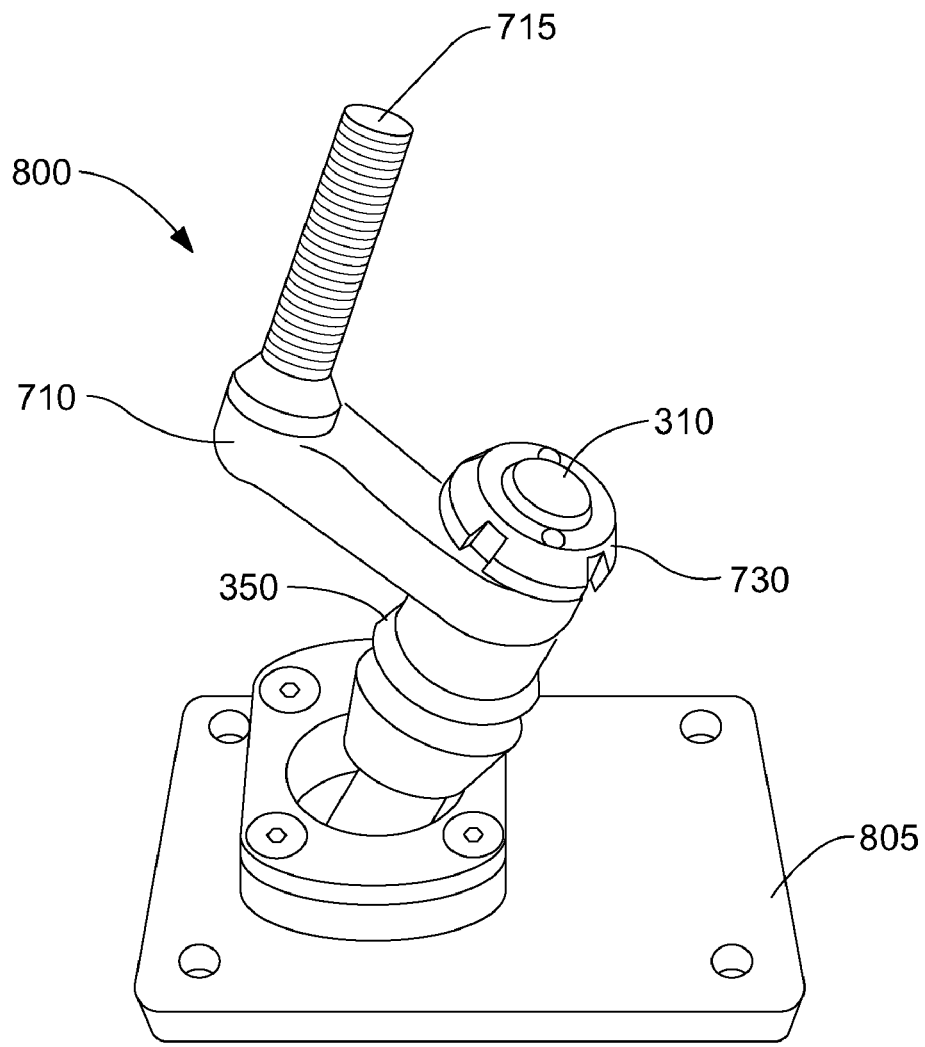
FIG. 9 illustrates by way of example a top perspective view showing how the embodiment of FIG. 8 has the full degree of freedom required to shift gears.

Of course, those skilled in the art will recognize a multiplicity of alternative ways that fully adjustable swivel shifter 800 may be embodied, manufactured, and assembled beyond the examples shown. Those skilled in the art will, moreover, appreciate that the fully adjustable swivel shift handle aspect is more generally applicable to other domestic sports cars such as, by way of example and not limitation, the dodge viper and Chevrolet corvette. FIG. 9 illustrates by way of example a top perspective view showing how the embodiment of FIG. 8 has the full degree of freedom required to shift gears. As shown, the present embodiment enables the user to maintain a continuous, substantially perpendicular gripping position while allowing 360-degree rotational adjustment.

Those skilled in the art will readily recognize a multiplicity of alternative embodiments and assembly techniques of the components the comprise center shaft 600. By way of example, and not limitation, some exemplar implementation variations, alternate embodiments and methods of manufacturing the present adjustable handle aspect of the instant invention will be set forth. For example, some embodiments of the present adjustable swivel shifter may replace spanner lock nut 730 with shifter handle alternate retaining means, including, a simple set of screws tapped into the sides of the shifter handle and then screwed onto the mounting location of the upper shaft thereby clamping the shifter handle thereupon. Although, this alternate embodiment eliminates the need for the spanning lock nut, there is additional risk of marring the upper shaft mounting location over time. In yet other embodiments of the present adjustable swivel shifter, instead of the shifter handle being attached to the upper shaft piece (as in the first embodiment), the shifter handle may be attached to the side of the upper shaft with bolts, whereby the swivel base becomes an extra component to the shifter assembly. Yet other embodiments of the present invention are contemplated wherein the shifter handle may not be provided with full rotational travel positioning, but, instead, be fixed in place, by, for example, a polygonal shaped bore in the handle (instead of a smooth bore as in the first embodiment) that allows the handle to only be located in stepped positions according to the polygon sides. It should be appreciated that such stepped position embodiments of the present adjustable swivel shift handle still work on the same basic design principle of first embodiment, and still use rotational adjustments instead of angular or "bending" of the shifter handle.

Figure 10:
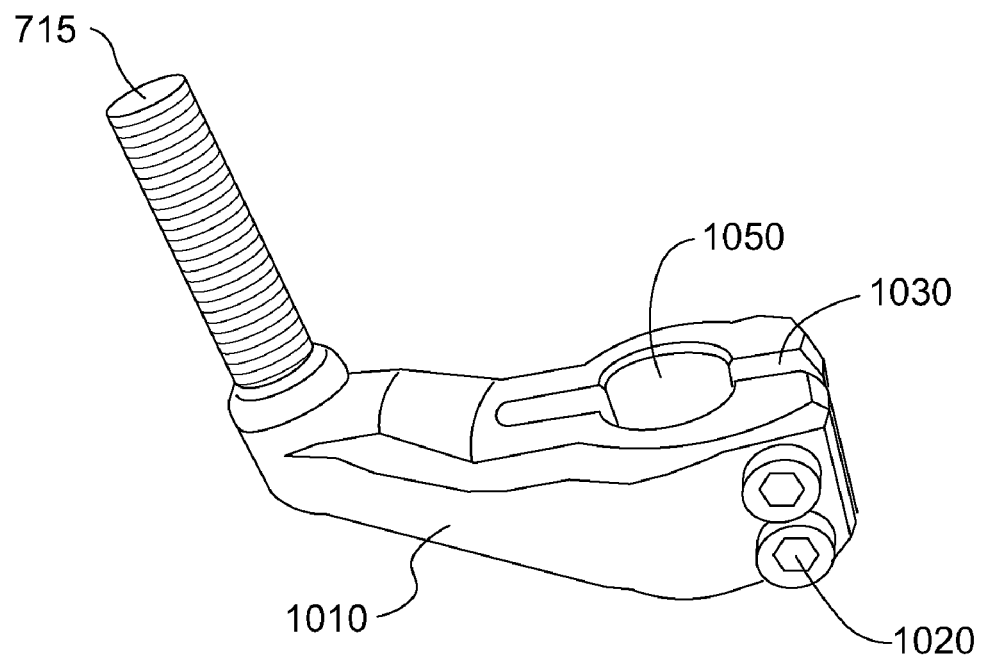
FIG. 10 illustrates by way of example a left side perspective view of a shifter handle according to a second shifter embodiment of the present invention.
Figure 11:
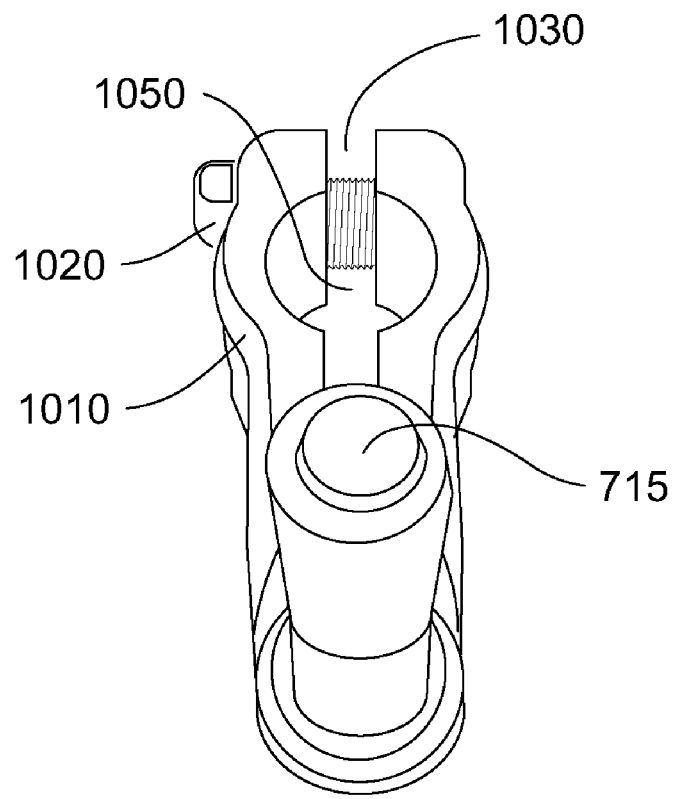
FIG. 11 illustrates by way of example a top perspective view of the split collar shifter handle shown in FIG. 10.
Figure 12:
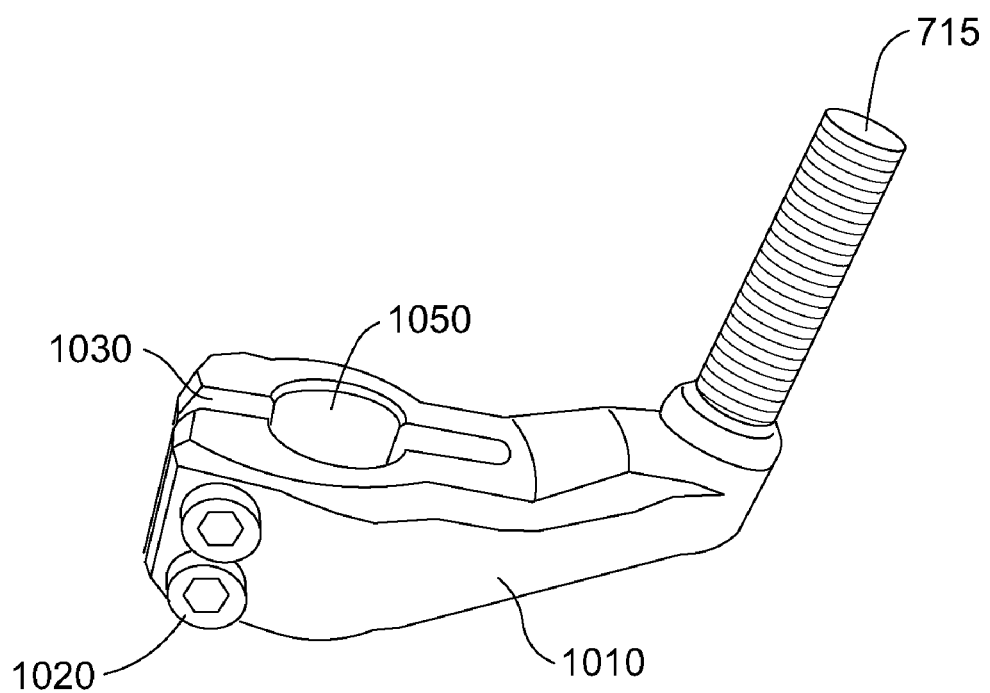
FIG. 12 illustrates by way of example a left side perspective view of the split collar shifter handle shown in FIG. 1.

FIG. 10 illustrates by way of example a left side perspective view of a shifter handle 1010 according to a second embodiment of the present invention. The second embodiment is substantially the same as the first embodiment, except that the mounting design of the shifting handle is modified according to a conventional "split collar" approach, very similar to how a mountain bike handlebar is clamped to the bike frame. In the second embodiment shown, shifter handle 1010 is tightened onto the upper shaft piece mounting location by tightening shifter handle mounting bolts 1020 to close a split color gap 1030, thereby making a upper shaft mounting hole 1050 the desired diameter to sufficiently grip onto the upper shaft (not shown). In many applications, an attendant aspect of the present split collar design is that it is relatively easier to install and adjust and generally holds the handle position better than the foregoing bored-hole embodiment. FIG. 11 illustrates by way of example a top perspective view of the split collar shifter handle of FIG. 10. FIG. 12 illustrates by way of example a left side perspective view of the split collar shifter handle shown in FIG. 10.

Alternative embodiments of the present invention are also contemplated that may retrofit existing aftermarket shifters and stock shifters to include the fully adjustable swivel shift handle aspect of the present invention. Yet other alternative embodiments of the present invention may only implement the fully adjustable swivel shift handle aspect of the present invention, and not the noise suppression aspect thereof, wherein the center shaft is similar to conventional center shafts (i.e., not split in half with a noise absorbent material interposed in between) except the upper end of the center shaft is adapted as described above to operably interface with the adjustable swivel shifter handle of the present invention.

Having fully described at least one embodiment of the present invention, other equivalent or alternative methods of implementing manual transmission shifters according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

I claim:

1. An automobile manual transmission shifter comprising:
   a lower shaft having a lower vertical symmetry axis, a lower end portion that is configured to properly interface with a manual automobile transmission and an upper end portion having a mounting boss where a top of said mounting boss comprises a tapped, threaded hole for receiving a shaft joining bolt;
   a vibration absorbent cap, said vibration absorbent cap being mounted upon said mounting boss, and configured to dampen at least part of the vibration transmitted from the manual automobile transmission;
   an upper shaft having an upper vertical symmetry axis, a lower end portion that is configured to properly mate with said vibration absorbent cap, and a hole extending down said upper vertical symmetry axis for passing a shank of the joining bolt, said lower end portion of said upper shaft being joined upon said vibration absorbent cap where said lower vertical symmetry axis and said upper vertical symmetry axis are in alignment along a common symmetry axis; and
   a shifter handle configured for supporting a shift knob and rotatably joined to an upper portion of said upper shaft such that its vertical motion is substantially constrained and is enabled to rotate on a substantially horizontal plane about said upper vertical symmetry axis.

2. The manual transmission shifter of claim 1, wherein said vibration absorbent cap is made of rubber.

3. The manual transmission shifter of claim 1, wherein the shaft joining bolt is inserted through said upper shaft from the top thereof and screwed into said the treaded hole of said mounting boss of said lower shaft, thereby fixedly joining said upper shaft to said lower shaft.

4. The manual transmission shifter of claim 1, wherein said shifter handle comprises a smooth, circular bored hole that is used for a continuous rotatable joining to said upper portion of said upper shaft.

5. The manual transmission shifter of claim 1, wherein said shifter handle comprises a bored hole that is polygonal shaped and used for a step-wise rotatable joining to said upper portion of said upper shaft.

6. The manual transmission shifter of claim 1, wherein said shifter handle comprises a split collar means for joining said shifter handle to said upper shaft.

7. The manual transmission shifter of claim 1, further comprising a bolt sleeve inserted in said hole for further dampening the vibration.

8. An automobile manual transmission shifter comprising:
   a shaft having a vertical symmetry axis, a lower end portion that is configured to properly interface with a manual automobile transmission and an upper end portion being adapted with a means for mounting a rotatably joined shifter handle;
   means for joining said lower end and said upper end, along said vertical symmetry axis, to dampen at least part of the vibration transmitted from the manual automobile transmission; and
   a shifter handle configured for supporting a shift knob and rotatably joined to said shifter handle mounting means to be vertically constrained and rotate in a substantially horizontal plane about said vertical symmetry axis.

9. The manual transmission shifter of claim 8, wherein said shifter handle comprises a smooth, circular bored hole that is used for the continuous rotatable joining to said shifter handle mounting means.

10. The manual transmission shifter of claim 8, wherein said shifter handle comprises a bored hole that is polygonal shaped and used for the step-wise rotatable joining to said shifter handle mounting means.

11. The manual transmission shifter of claim 8, wherein said shifter handle comprises a split collar for joining to said shifter handle mounting means.

12. An automobile manual transmission shifter comprising:
   means for dampening at least part of the vibration transmitted from the manual automobile transmission through a shifter shaft having a vertical symmetry axis; and
   means for maintaining a continuous gripping position of a shift knob perpendicular to a substantially horizontal plane while enabling rotational adjustment about said vertical symmetry axis of said shifter shaft in said horizontal plane and constraining vertical movement.

* * * * *